US010393211B2

(12) United States Patent
Grzesik et al.

(10) Patent No.: US 10,393,211 B2
(45) Date of Patent: Aug. 27, 2019

(54) HYDRAULIC DAMPER WITH A HYDRAULIC STOP ARRANGEMENT

(71) Applicant: BEIJINGWEST INDUSTRIES CO., LTD., Beijing (CN)

(72) Inventors: Radoslaw Pawel Grzesik, Pcim (PL); Pawel Edward Kus, Cracow (PL); Piotr Grzegorz Maton, Zielonki (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/865,157

(22) Filed: Jan. 8, 2018

(65) Prior Publication Data

US 2018/0223941 A1 Aug. 9, 2018

Related U.S. Application Data

(60) Provisional application No. 62/456,283, filed on Feb. 8, 2017.

(51) Int. Cl.
*F16F 9/49* (2006.01)
*F16F 9/348* (2006.01)
(Continued)

(52) U.S. Cl.
CPC ................ *F16F 9/49* (2013.01); *F16F 9/185* (2013.01); *F16F 9/3214* (2013.01); (Continued)

(58) Field of Classification Search
CPC .. F16F 9/49; F16F 9/185; F16F 9/3257; F16F 9/348; F16F 9/368; F16F 9/483; (Continued)

(56) References Cited

U.S. PATENT DOCUMENTS

| | | | |
|---|---|---|---|
| 1,965,294 | A | 7/1934 | Marshall |
| 2,088,875 | A | 8/1937 | Serste |

(Continued)

FOREIGN PATENT DOCUMENTS

| | | |
|---|---|---|
| BE | 520847 | 6/1953 |
| DE | 8130523 | 2/1982 |

(Continued)

OTHER PUBLICATIONS

Extended European Search Report dated Jul. 26, 2018, for counterpart European patent application No. EP18155046.8.

*Primary Examiner* — Xuan Lan Nguyen
(74) *Attorney, Agent, or Firm* — William H. Honaker; Dickinson Wright PLLC

(57) ABSTRACT

Disclosed is a hydraulic damper wherein the main damper tube has a narrowed section and it includes at least one additional piston assembly adapted to be received in the narrowed section to generate additional damping force. The piston assembly comprises a compression valve assembly and a rebound valve assembly each comprising at least one deflective disc. A sealing ring assembly is disposed between the compression and rebound valve assembles and comprises a first annular member having a plurality of channels covered by the deflective disc of the compression valve assembly; a second annular member having a plurality of channels, covered by the deflective disc of the rebound valve assembly; an axial projection between the annular members radially internal to the axial channels; and a sealing ring displaceable axially between the annular members and radially over the axial projection and adapted to cooperate with the narrowed section of the tube.

15 Claims, 6 Drawing Sheets

(51) Int. Cl.
*F16F 9/36* (2006.01)
*F16F 9/48* (2006.01)
*F16F 9/18* (2006.01)
*F16F 9/32* (2006.01)

(52) U.S. Cl.
CPC ............ *F16F 9/3257* (2013.01); *F16F 9/348* (2013.01); *F16F 9/3484* (2013.01); *F16F 9/3488* (2013.01); *F16F 9/368* (2013.01); *F16F 9/483* (2013.01); *F16F 2234/04* (2013.01)

(58) Field of Classification Search
CPC ...... F16F 9/3214; F16F 9/3484; F16F 9/3488; F16F 2234/04; B60G 17/08; B60G 13/08; B60G 2202/24
See application file for complete search history.

(56) References Cited

U.S. PATENT DOCUMENTS

| | | | | | |
|---|---|---|---|---|---|
| 2,396,227 | A | | 3/1946 | Beecher | |
| 3,062,331 | A | | 11/1962 | Wyman | |
| 3,447,644 | A | | 6/1969 | Duckett | |
| 3,828,897 | A | | 8/1974 | Nandyal | |
| 3,833,248 | A | | 9/1974 | Wossner et al. | |
| 4,230,309 | A | | 10/1980 | Schnitzius | |
| 4,383,595 | A | * | 5/1983 | Schnitzius | F16F 9/49 188/281 |
| 4,595,182 | A | | 6/1986 | Freitag et al. | |
| 4,796,871 | A | | 1/1989 | Bauer et al. | |
| 5,157,806 | A | * | 10/1992 | Wartian | E05F 3/02 16/49 |
| 5,823,306 | A | * | 10/1998 | de Molina | F16F 9/34 188/322.15 |
| 6,311,813 | B1 | | 11/2001 | Lauderbach et al. | |
| 2003/0006539 | A1 | | 1/2003 | Bertram et al. | |
| 2008/0284073 | A1 | | 11/2008 | Heleski | |
| 2014/0326556 | A1 | | 11/2014 | Ruhlman et al. | |
| 2015/0330475 | A1 | * | 11/2015 | Slusarczyk | B21D 22/20 188/288 |
| 2016/0153517 | A1 | | 6/2016 | Lizarraga Senar | |

FOREIGN PATENT DOCUMENTS

| | | |
|---|---|---|
| DE | 3301544 | 7/1984 |
| DE | 102005030403 | 4/2007 |
| EP | 2952775 | 12/2015 |
| FR | 399700 | 1/1909 |
| FR | 1006531 | 1/1948 |
| FR | 1056323 | 2/1952 |
| FR | 1120705 | 1/1955 |
| FR | 2417683 | 9/1979 |
| GB | 16632 | 7/1913 |
| JP | 63270935 | 11/1988 |
| JP | 2738417 | 6/2014 |
| WO | 02101262 | 12/2002 |
| WO | 2012112076 | 8/2012 |

* cited by examiner

HYDRAULIC DAMPER WITH A HYDRAULIC STOP ARRANGEMENT

RELATED APPLICATIONS

This application claims the benefit of U.S. Provisional Application Ser. No. 62/456,283 filed on Feb. 8, 2017.

STATEMENT REGARDING FEDERALLY SPONSORED RESEARCH

NONE.

TECHNICAL FIELD

This invention relates generally to hydraulic dampers for motor vehicles and more particularly to a hydraulic damper having an additional piston assembly to generate additional damping force.

BACKGROUND OF THE INVENTION

Hydraulic dampers, in particular a motor vehicle hydraulic suspension dampers, are known in the art. In a typical design the hydraulic damper comprises a tube filled with a working liquid, a main piston assembly disposed slidably inside a main section of the tube, with the main piston attached to a piston rod led outside the damper. The main piston divides the tube into a rebound chamber and a compression chamber, and is provided with both a rebound valve assembly and a compression valve assembly to control a flow of the working liquid within the tube during a rebound stroke and a compression stroke of the damper. In some designs having enhanced damping properties at least one end of the tube is provided with a narrowed section of a smaller diameter than the main section of the tube and the damper is further provided with at least one additional piston assembly, displaceable along with the main piston assembly and adapted to be slidably introduced into the narrowed section of the tube to generate additional damping force.

The additional piston assembly along with the narrowed section of the main tube forms what is called in the industry a hydraulic stop arrangement that generates additional damping force over a predefined end section of an operating travel range of the piston rod.

Exemplary dampers provided with such hydraulic stop arrangements are disclosed in patent publications EP 2 302 252 and EP 2 952 775. These hydraulic stop arrangements permit progressive generation of additional damping force depending not only on the additional piston assembly position but also on its velocity within the narrowed section, which may be tunable.

It is desirable to provide a hydraulic damper with a hydraulic stop arrangement that provides a progressive increase of damping force that is dependent on piston rod displacement but that also limits damping forces exceeding predefined and tunable thresholds. It is also desirable that such a damper should be of a simple construction, cost efficient and simple to manufacture and that the hydraulic stop arrangement might be applied as an add-on in existing damper constructions.

SUMMARY OF THE INVENTION

The present invention relates to a hydraulic damper, in particular to a motor vehicle hydraulic suspension damper, comprising: a tube filled with a working liquid; a main piston assembly disposed slidably inside a main section of the tube and attached to a piston rod led outside the damper with the main piston assembly dividing the tube into a rebound chamber and a compression chamber. The main piston assembly is provided with a rebound valve assembly and a compression valve assembly to control a flow of the working liquid within the tube during a rebound stroke and a compression stroke of the damper. At least one end of the tube is further provided with a narrowed section having a smaller diameter than a diameter of the main section of the tube and the damper is further provided with at least one additional piston assembly, displaceable along with the main piston assembly and adapted to be slidably introduced into the narrowed section of the tube to generate additional damping force. The additional piston assembly comprises a compression valve assembly comprising at least one deflective disc; a rebound valve assembly comprising at least one deflective disc; a sealing ring assembly disposed between the compression valve assembly and the rebound valve assembly. The sealing ring assembly further comprises: a first annular member provided with a number of, preferably, equiangularly spaced axial channels covered on the rebound side by the at least one deflective disc of the compression valve assembly; a second annular member provided with a number of, preferably, equiangularly spaced axial channels covered on the compression side by the at least one deflective disc of the rebound valve assembly; an axial projection disposed between the first annular member and the second annular member at a radially internal side of the axial channels of the annular members; and a sealing ring displaceable axially between the annular members and radially over the axial projection and adapted to cooperate with the narrowed section of the tube.

The hydraulic stop arrangement according to the present invention may be easily configured to generate additional damping force both for compression and rebound strokes enabling for a wide range tuning of the force gains, wherein the performance of the arrangement depends both on the additional piston position as well as on the additional piston velocity.

Preferably the narrowed section of the tube comprises a conical section having an inclination within the range of 0.3 to 5 degrees, in particular, within the range of 0.5 to 2 degrees. The small inclination of the narrowed conical section ensures smooth engagement behavior of the hydraulic stop.

Preferably the at least one deflective disc of the compression valve assembly cooperates with an annular seat of the first annular member. Also preferably the at least one deflective disc of the rebound valve assembly cooperates with an annular seat of the second annular member. The annular seats surround annular reservoirs of the axial channels and equalize the pressure acting on the deflective discs.

Preferably the at least one deflective disc of the compression valve assembly and the at least one deflective disc of the rebound valve assembly are each provided with a number of, preferably, equiangularly distributed, radial recesses enabling for a flow of the working liquid through these radial recesses in a flat, undeflected position of the disc(s). These radial recesses, whether found on only the compression valve assembly or only the rebound valve assembly or on both assemblies, provide yet another tuning parameter for shaping the characteristics of the damper.

Preferably the compression valve assembly and/or the rebound valve assembly comprise(s) at least one additional spring for preloading its respective at least one deflective disc. The spring(s) may provide a blow off safety valve functionality to the compression valve assembly and the rebound valve assembly.

Preferably the radially internal side of the sealing ring is supported by at least one support member. When present, preferably the support member is provided with a number of, preferably equiangularly spaced, radial channels. Preferably the radially external side of the sealing ring is chamfered. Chamfering of the sealing ring increases durability of the sealing ring. Preferably the sealing ring is made of polymeric material. Use of a polymeric material along with the small inclination of the narrowed conical section also contributes to a smooth engagement behavior of the hydraulic stop. Preferably the sealing ring is biased by a spring, preferably in a form of a spring disc.

Preferably the narrowed section of the tube is located at the compression end of the damper main tube. In such a case, the additional piston assembly is preferably attached to an additional rod attached to the piston rod of the damper. The damper is preferably a twin-tube damper. Preferably the narrowed section of the tube is provided at least partially with at least one axial slot. The narrowed section of the tube may also be in the form of an insert disposed inside the tube.

These and other features and advantages of this invention will become more apparent to those skilled in the art from the detailed description of a preferred embodiment. The drawings that accompany the detailed description are described below.

BRIEF DESCRIPTION OF THE DRAWINGS

The invention shall be described and explained below in connection with the attached drawings on which.

DETAILED DESCRIPTION OF A PREFERRED EMBODIMENT

Figure 1:
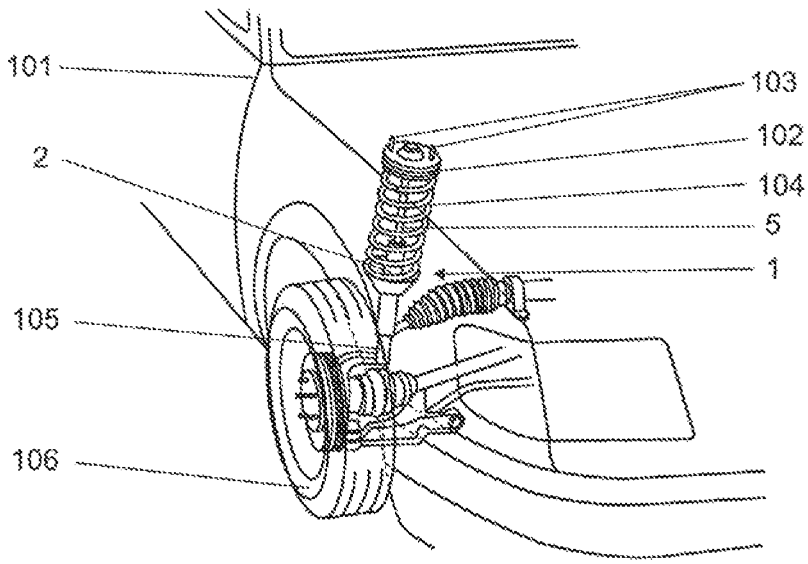
FIG. 1 illustrates a fragment of a vehicle suspension comprising the damper according to the present invention.

The drawing of FIG. 1 schematically illustrates a fragment of an exemplary vehicle suspension comprising the twin-tube damper 1 of the present invention attached to a vehicle chassis 101 by means of a top mount 102 and a number of screws 103 disposed on the periphery of the upper surface of the top mount 102. The top mount 102 is connected to a coil spring 104 and a piston rod 5 of the damper 1. An external tube 2 of the damper 1 is connected to a knuckle 105 supporting a vehicle wheel 106 by means of a bushing 6 and a sleeve 7, see FIG. 2.

Figure 2:
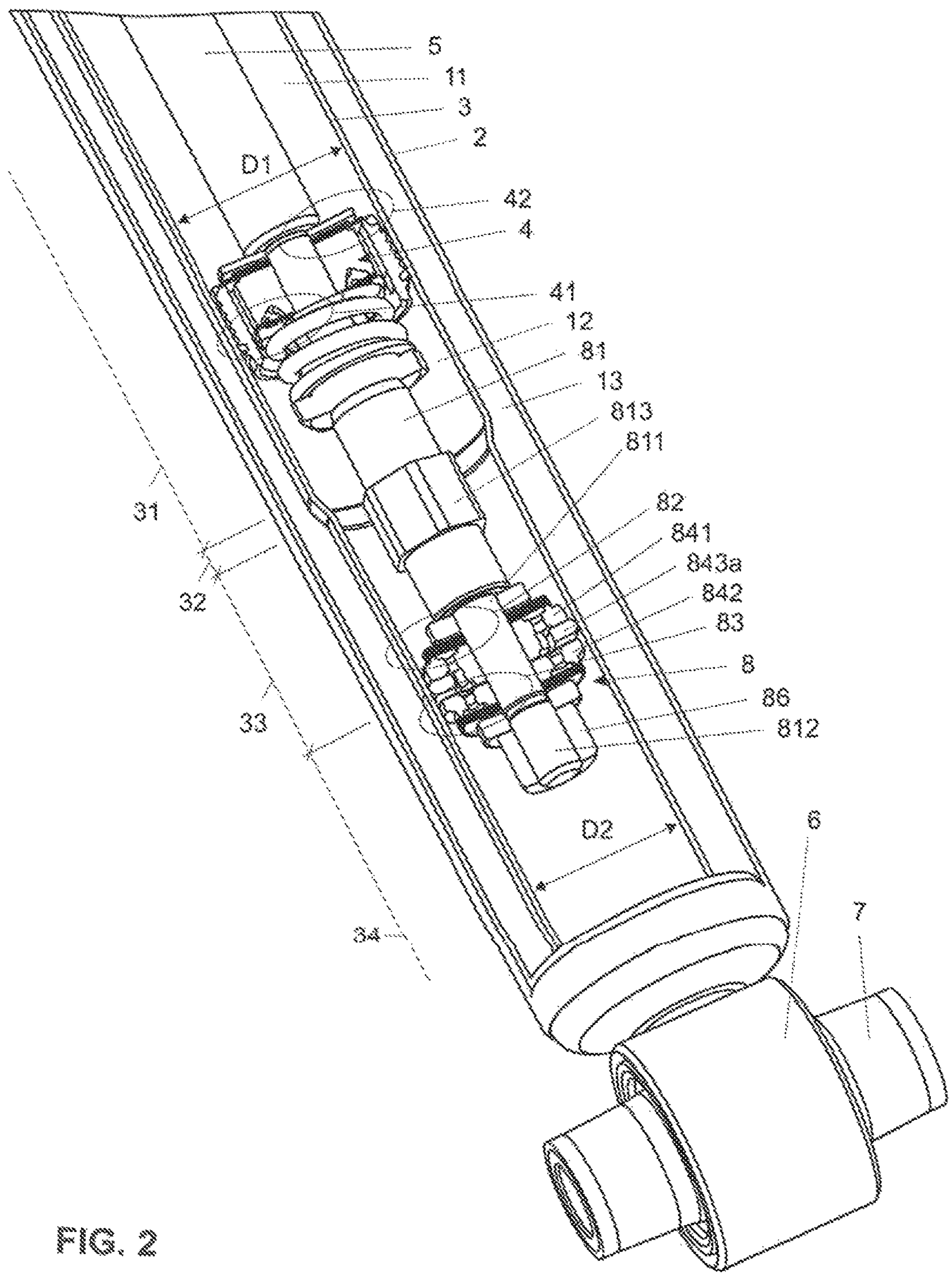
FIG. 2 is a schematic partial cross-sectional view of an embodiment of a twin-tube damper according to the present invention with a hydraulic compression stop.

As shown in FIG. 2, the damper 1 comprises an external tube 2 and a main tube 3 filled with a viscous working liquid. Inside the main tube 3 is a movable main piston assembly 4 attached to the piston rod 5, which is led outside the damper 1 through a sealed piston rod guide, not shown. The damper 1 is also provided with a base valve assembly, not shown, fixed at the other end of the main tube 3. The piston assembly 4 makes a sliding fit with an inner surface of a main cylindrical section 31 of the main tube 3 and divides the tube 3 into a rebound chamber 11 located above the main piston assembly 4 and a compression chamber 12 located between the main piston assembly 4 and the base valve assembly. An additional compensation chamber 13 is located at the other side of the base valve assembly.

The term "compression" as used herein with reference to particular elements of the damper 1 refers to these elements or parts of elements which are adjacent to the compression chamber 12 or, in a case of the working liquid flow direction, it refers to this flow direction that takes place during the compression stroke of the damper 1. Similarly the term "rebound" as used in this specification with reference to particular elements of the damper 1 refers to these elements or these parts of particular elements which are adjacent to the rebound chamber 11 or, in a case of the working liquid flow direction, it refers to this flow direction that takes place during the rebound stroke of the damper 1.

The main piston assembly 4 is provided with compression 42 and rebound 41 valve assemblies to control the flow of a working liquid passing between the rebound chamber 11 and the compression chamber 12 while the main piston assembly 4 is in motion. Also the base valve assembly is provided with rebound and compression valve assemblies to control the flow of the working liquid passing between the additional compensation chamber 13 and the compression chamber 12, respectively, during rebound and compression strokes of the damper 1. As known to those skilled in the art, valve assemblies 41, 42 of the main piston assembly 4, as well as the valve assemblies of the base valve assembly provide design parameters that may be used to shape the desired dampening characteristics of the damper 1.

The damper 1 is further provided with a hydraulic compression stop arrangement located in the compression chamber 12 to generate an additional damping force at the end of the compression stroke, e.g. in order to avoid an abrupt stop of the piston assembly 4 at the end of the stroke. The compression stop arrangement comprises an additional piston assembly 8 displaceable along with the main piston assembly 4 and cooperating with the narrowed sections, 33 and 34, disposed in the main tube 3, as shall be explained later with reference to some preferable embodiments of the present invention.

Obviously, another hydraulic stop arrangement of a similar construction may be located in the rebound chamber 11 to generate an additional damping force at the end of the rebound stroke of the damper 1 if desired.

The additional piston assembly 8 is coaxially fixed with the main piston assembly 4 by means of a rod 81 screwed onto a threaded end of the piston rod 5 and thus forming a nut fixing all the components of the main piston assembly 4 together. To this end, the rod 81 is provided with a hexagonal torque application surface 813. By adjusting the length of the rod 81 it is possible to change the stop arrangement activation point with respect to the stroke position.

Reference numerals to functionally equivalent elements remain the same on all figures of the drawing, wherein where appropriate, they are supplemented with additional suffixes (a, b) to differentiate elements of the same functionality but different construction.

Figure 5:
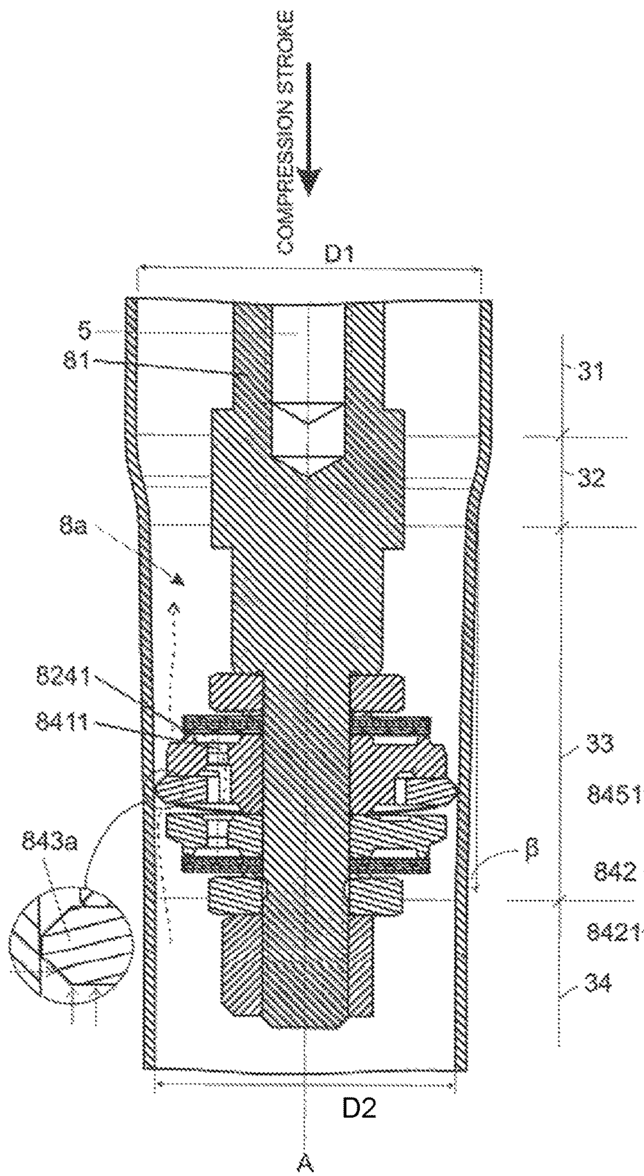
FIG. 5 is a schematic cross-sectional view illustrating the operation of the first embodiment of the hydraulic compression stop shown in FIG. 3 according to the present invention during a compression stroke.
Figure 6:
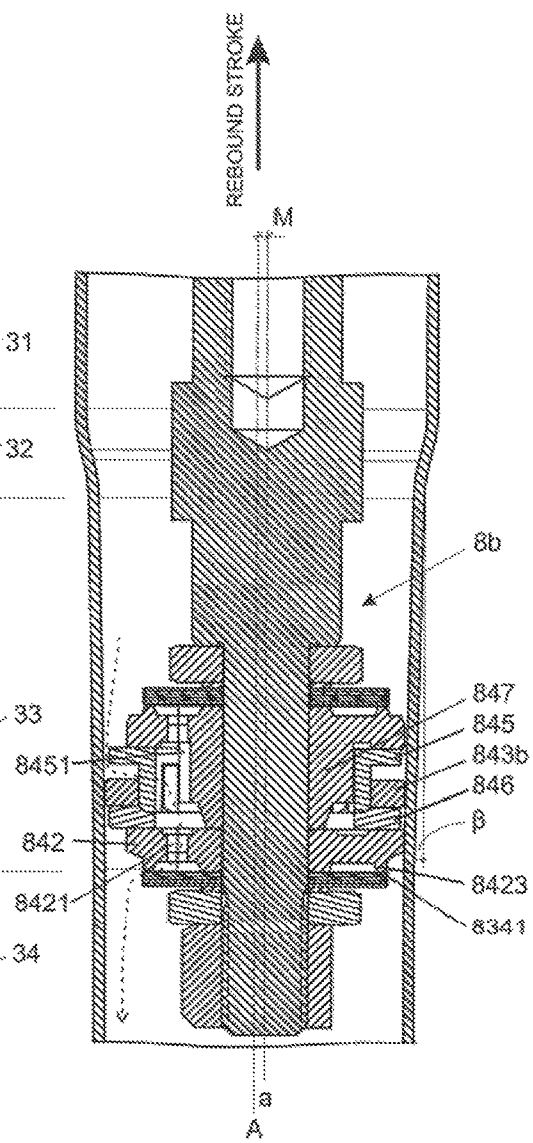
FIG. 6 is a schematic cross-sectional view illustrating the operation of the second embodiment of the hydraulic compression stop shown in FIG. 4 according to the present invention during a rebound stroke.

As shown in FIG. 2, FIG. 5 and FIG. 6 the main cylindrical section 31 of the tube 3 has a diameter D1. Preferably in the first and the second embodiment of the present invention the diameter D1 has a value of 32 millimeters (mm). While the additional piston assembly 8 remains within the main cylindrical section 31 of the tube, it does not generate any substantial flow restrictions for the working liquid passing around it because its diameter is less than D1. In this embodiment the main section 31 of the tube 3 transforms through a first conical section 32 to a second narrowed conical section 33 and a narrowed cylindrical section 34 having a diameter D2 that is smaller than D1. Preferably in the first and in the second embodiment of the present invention diameter D2 is 28 mm.

The first conical section 32 marks the entry of the hydraulic compression stop for the additional piston assembly 8, while both the second conical section 33 and the narrowed cylindrical section 34 form sliding surfaces for the additional piston assembly 8. The angle ß, see FIG. 5 and FIG. 6, of inclination of the second conical section 33 preferably is only about 1.6 degrees so that its virtual apex lies far below the damper 1. Such a shaping provides smooth activation of the hydraulic compression stop and the additional piston assembly 8.

Figures 3, 4:
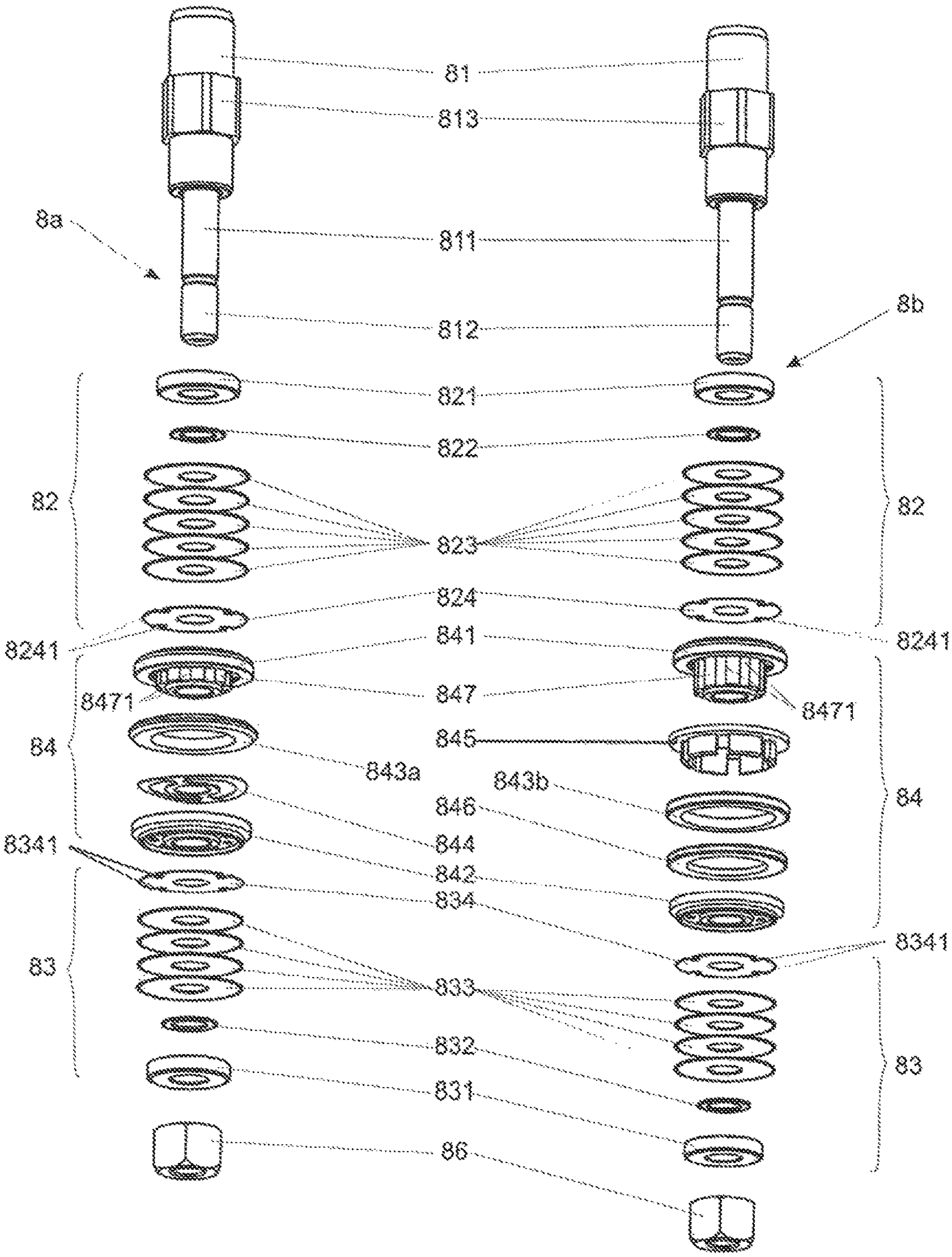
FIG. 3 is a schematic axonometric exploded view of an additional piston assembly of a first embodiment of the hydraulic compression stop shown in FIG. 2 according to the present invention.
FIG. 4 is a schematic axonometric exploded view of an additional piston assembly of a second embodiment of the hydraulic compression stop according to the present invention.

As shown in FIG. 3 and FIG. 4, each embodiment of the additional piston assemblies **8*a* and 8*b* is provided with a compression valve assembly 82, a rebound valve assembly 83, and a sealing ring assembly 84**.

The compression valve assembly 82 is formed from a stack of discs comprising a retainer 821, distancing the compression valve assembly 82 components from the rod 81, a spacer 822, a plurality of main deflective discs 823, preferably five, and a supplementary deflective disc 824. The rebound valve assembly 83 has a similar construction and is formed from a supplementary disc 834, a plurality of main deflective discs 833, preferably five, a spacer 832, and a retainer 831. Spacers 822 and 832 provide the span necessary for the discs, 823, 824, 833 and 834 to deflect.

The diameter of the main deflective discs 823 and 833 is substantially the same as the diameter of the supplementary deflective discs 824 and 834.

The sealing ring assembly 84 is disposed between the compression 82 and the rebound 83 valve assemblies. It comprises a first annular member 841 provided with a plurality of, preferably ten, equiangularly spaced axial channels 8411, see FIG. 5-9, a second annular member 842 provided with a plurality of, preferably ten, equiangularly spaced axial channels 8421, see FIGS. 5-9 and FIG. 11, and an axial projection 847 which in these embodiments is made as a uniform element with the first annular member 841.

At the rebound side, the outlets of the axial channels 8411 open at an annular reservoir 8412 surrounded by an annular seat 8413 and are covered by the supplementary deflective disc 824 of the compression valve assembly 82. Similarly, at the compression side, the outlets of the axial channels 8421 are open at an annular reservoir 8422 surrounded by an annular seat 8423, see FIG. 11, and are covered by the supplementary deflective disc 834 of the rebound valve assembly 83.

In the embodiment shown in FIG. 3 and FIG. 5 a sealing ring **843*a* is loosely disposed over the axial projection 847 and biased at the compression side by a spring disc 844 abutting the rebound side of the second annular member 842. The spring disc 844 eliminates noises that might be generated when the sealing ring 843*a* engages the surface of the second conical section 33 of the tube 3**.

The sealing ring **843*a* may therefore displace to a certain extent axially, between the annular members 841 and 842, as well as radially, over the axial projection 847. Furthermore, the radially external surface of the sealing ring 843*a* is chamfered to increase durability of the sealing ring 843*a* as shall be explained later, see FIG. 5**.

In the embodiment shown in FIG. 4 and FIG. 6, a sealing ring **843*b* is supported by a main, rigid, sleeve shaped support member 845 and a supplementary, rigid, ring shaped support member 846. Both support members 845 and 846 define an annular groove in which the sealing ring 843*b* is disposed. The sealing ring 843*b* may displace axially, between the support members 845 and 846. The sealing ring 843*b* may also displace radially, along with the support members 845 and 846, over the axial projection 847**.

The sealing rings **843*a* and 843*b*** are made of polymeric material and in particular of a modified Teflon polymeric material.

All the components of the additional piston assemblies **8*a* and 8*b* are secured on a narrowed axial projection 811 of the rod 81 by means of a fixing member having in these embodiments a form of a nut 86 screwed on an external thread 812 at the end of the axial projection 811. Therefore the inner edges of all the discs 823, 824, 833, and 834** are axially fixed which enables for their deflection after a certain velocity threshold is reached in order to enable for a more unrestricted flow of the working liquid.

The supplementary deflective disc 824 of the compression valve assembly 82 covering the annular reservoir 8412 of the first annular member 841 of the sealing ring assembly 84 is further provided with a plurality of, preferably four, radial recesses or notches 8241 formed equiangularly on the outer edge thereof, so that a limited flow of the working liquid is possible through these radial notches 8241 even in a flat, undeflected position of the deflective discs 823 and 824.

In a similar way the supplementary disc 834 of the rebound valve assembly 83 covering the annular reservoir 8422 of the first annular member 842 of the sealing ring assembly 84 is provided with a plurality of, preferably four, radial recesses or notches 8341 formed equiangularly on the outer edge thereof so that a limited flow of the working liquid is possible through these radial notches 8341 even in a flat, undeflected position of the deflective discs 833 and 834

FIG. 5 and FIG. 6 illustrate the operation of the first 8*a* and the second 8*b* embodiment of the additional piston assembly respectively during the compression stroke and the rebound stroke.

During the compression stroke travel of the additional piston assembly 8*a* along the main section 31 and then along the first conical section 32 of the tube 3, the working liquid flows out of the narrowed section 34 around the additional piston assembly 8*a* to the main section 33 of the tube 3. Upon entry into the second conical section 33 the working liquid may still flow around the additional piston assembly 8*a*. Nonetheless, as the diameter of the second narrowed conical section 33 diminishes, flow restrictions increase and an increasing amount of the working liquid will also flow through the annular channel formed beneath and at the radially internal side of the sealing ring 843*a* and further through the axial channels 8411 of the first annular member 841 and the radial notches 8241 of the supplementary deflective disc 824.

At a certain point the sealing ring 843*a* will engage and slide along the internal wall of the tube 3. In this position, shown in FIG. 5, the working liquid may flow out of the narrowed section 34 only through the channel depicted with a dashed arrow. The moment of engaging the hydraulic stop is however smooth due to the small inclination of the second narrowed conical section 33.

After reaching a certain tunable velocity threshold, the liquid pressure will force the discs 823 and 824 to deflect opening an additional annular channel enabling for an increased outflow of the working liquid.

As shown in an enlarged detail in FIG. 5, the external surface of the sealing ring 843*a* is chamfered both on the rebound and the compression sides. Therefore the pressure of the working liquid acts on the sealing ring 843*a* also perpendicularly and toward the axis A of the damper, as shown for the compression stroke with a horizontal arrow, and a bending moment acting on the sealing ring 843*a* in a direction perpendicular to the damper axis A is reduced. Moreover a small sealing surface between the sealing ring 843*a* and the tube 3 is obtained. All these factors reduce hydraulic imbalance and minimize the influence of any possible misalignment of the sealing ring 843*a* so that a risk of sucking the sealing ring 843*a* in a space between the additional piston assembly 8*a* and the tube 3 is minimized. Durability of the sealing ring 843*a* is consequently significantly improved.

As shown in FIG. 6, when the stroke of the damper changes to rebound, the pressure of the working liquid acting on a sealing ring 843*b* displaces it towards the second annular member 842, more precisely towards the supplementary support member 846. As illustrated with a dashed arrow the working liquid may flow out of the main section 31 of the tube 3 to the narrowed cylindrical section 34, around the main support member 845 and through its radial channels 8451, through the axial channels 8421 of the second annular member 842 and finally through the radial notches 8341 of the supplementary deflective disc 834 of the rebound valve assembly 83. Obviously after reaching a certain tunable velocity threshold, the liquid pressure will force the discs 833 and 834 to deflect opening an additional annular channel enabling for an increased outflow of the working liquid.

FIG. 6 further illustrates an extreme case of a geometrical misalignment M between the axis A of the main tube 3 of the damper 1 and the axis "a" of the rod 81.

Nonetheless, this misalignment (M=|A−a|) is compensated as the sealing ring 843*b* is displaceable radially over the axial projection 847 of the sealing ring assembly 84 along with the support members 845 and 846. A plurality of axial grooves 8471 in the axial projection 847, see FIG. 3 and FIG. 4, ensure the flow of the working liquid even if the support member 845 or the sealing ring itself radially covers the radially external surface of the projection 847 so that the flow of the working liquid through the axial channels 8421 of the second annular member 842 or axial channels 8411 of the first annular member 841 is uniformly distributed.

Although the functionality of the hydraulic stop arrangement according to the present invention has been described above with respect to two different embodiments 8*a* and 8*b* of the additional piston assembly, it is believed that it shall be clearly understood mutatis mutandis by the skilled in the art.

Figure 7:
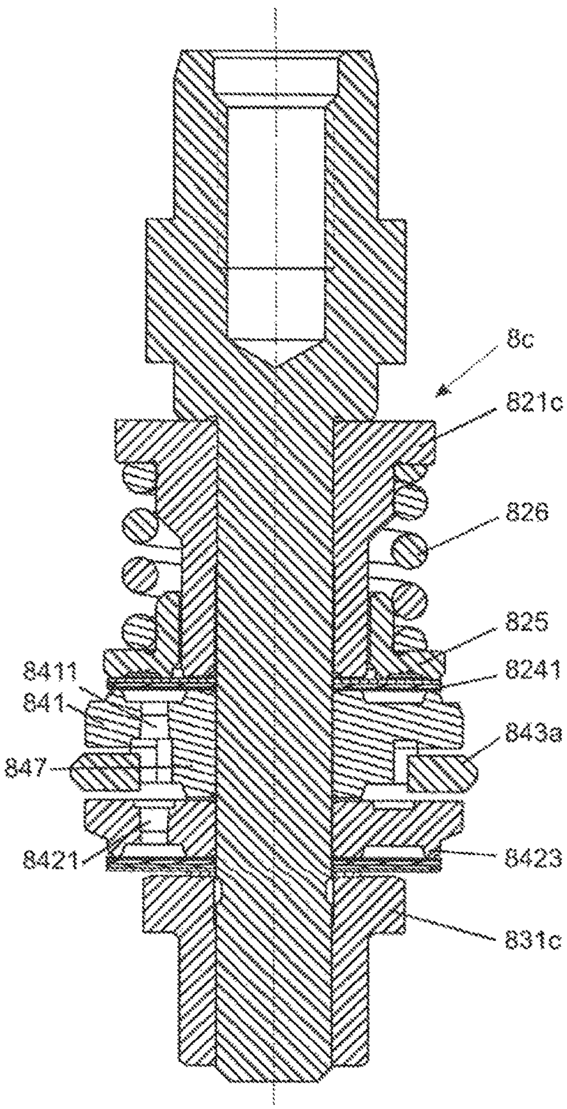
FIG. 7 is a schematic cross-sectional view illustrating an additional piston assembly of a third embodiment of the hydraulic compression stop according to the present invention.

FIG. 7 shows an embodiment of an additional piston assembly 8*c* in which the compression valve assembly 82 has been provided with an additional spring 826 preloaded in between a retainer 821*c* and a spring seat 825 disposed slidably over the retainer 821*c*. The spring seat 825 abuts the rebound side of the deflective disc 823 most distal with respect to the sealing ring assembly 84.

The spring 826 provides yet another velocity threshold that may be used to shape the desired characteristic of the hydraulic stop arrangement. If the additional piston assembly 8*c* velocity during a compression stroke is low the liquid will flow through the notches 8241 of the supplementary deflective disc 82. After reaching a certain higher velocity threshold the discs 823 and 824 will deflect and finally, reaching yet another higher velocity threshold will compress the spring 826. In this embodiment the sealing ring 843 is loosely disposed over the axial projection 847 of the first annular member 841 with no additional spring disc 844.

Figure 8:
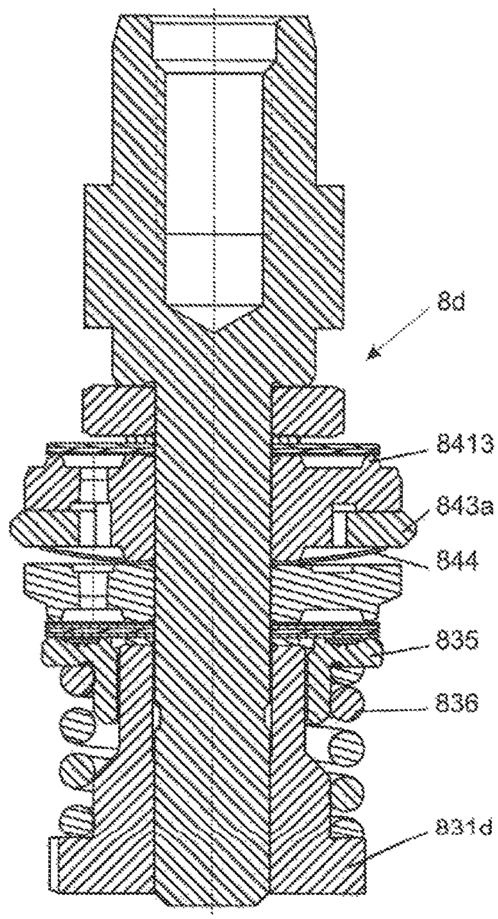
FIG. 8 is a schematic cross-sectional view illustrating an additional piston assembly of a fourth embodiment of the hydraulic compression stop according to the present invention.

A similar embodiment of an additional piston assembly 8*d* is disclosed in FIG. 8. Here the rebound valve assembly 83 is provided with an additional spring 836 preloaded in between a retainer 831*d* and a spring seat 835 disposed slidably over the retainer 831*d*.

Figure 9:
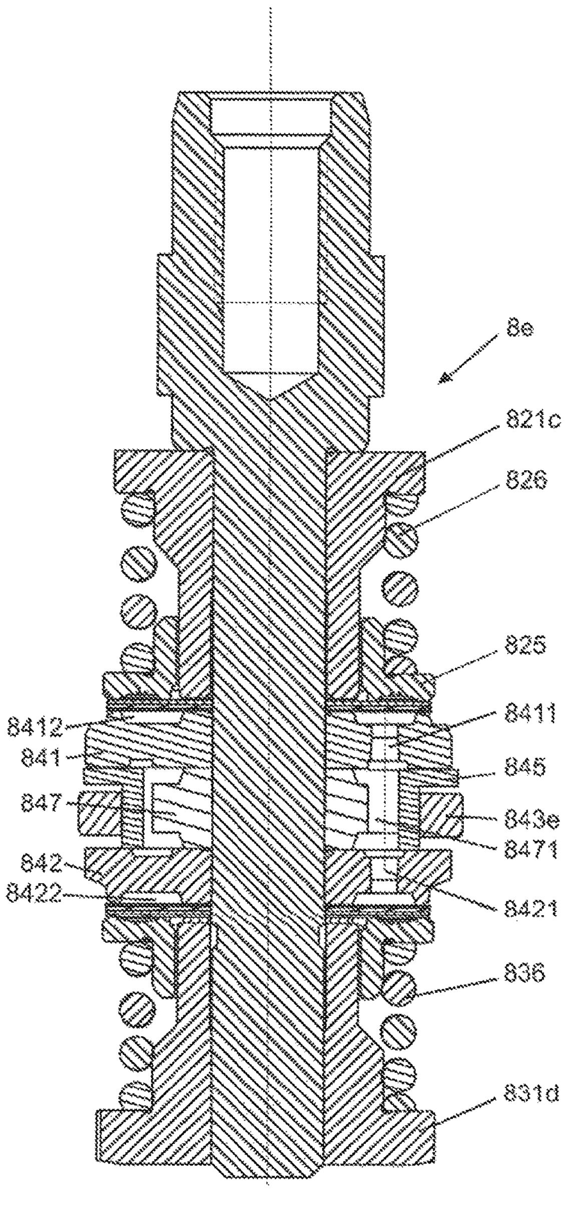
FIG. 9 is a schematic cross-sectional view illustrating an additional piston assembly of a fifth embodiment of the hydraulic compression stop according to the present invention.
Figure 10A:
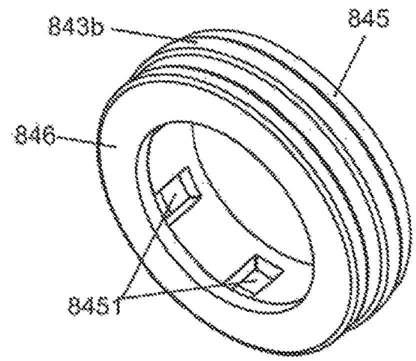
FIG. 10A and FIG. 10B are schematic axonometric views of a part of a sealing ring assembly employed in the second embodiment of the hydraulic compression stop according to the present invention in a perspective view, FIG. 10A, and cross-sectional view, FIG. 10B.
Figure 10B:
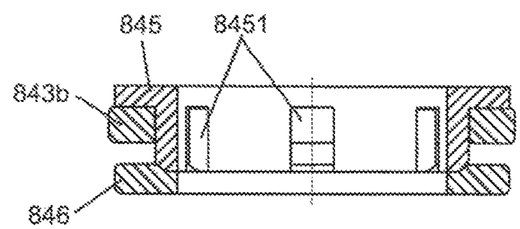
Figure 11:
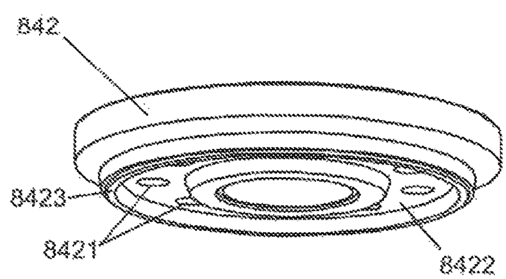
FIG. 11 is a schematic axonometric view of an embodiment of an annular member of the sealing ring assembly according to the present invention.

In another embodiment of an additional piston assembly 8*e* disclosed in FIG. 9 both the compression valve assembly 82 and the rebound valve assembly 83 comprise additional springs 826 and 836. Moreover the first annular member 841 and the second annular member 842 of the sealing ring assembly 84 have the same construction and are separated by the axial projection 847 in a form of a sleeve. The sealing ring 843*e* is supported only by a single support member 845.

Obviously a damper according to the present invention may contain two hydraulic stops both at the compression and at the rebound side. Furthermore the conical sections 32 and/or 33 may be provided with slots providing an additional tuning parameter. As shall be appreciated by those skilled in the art the invention is equally applicable also for mono-tube dampers.

The above embodiments of the present invention are therefore merely exemplary. The figures are not necessarily to scale, and some features may be exaggerated or minimized. These and other factors however should not be considered as limiting the spirit of the invention, the intended scope of protection of which is indicated in appended claims.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A hydraulic damper for a motor vehicle hydraulic suspension damper, comprising:

a tube filled with a working liquid, a main piston assembly disposed slidably inside a main section of said tube and attached to a piston rod led outside said damper, said main piston assembly dividing said tube into a rebound chamber and a compression chamber;

said main piston assembly having a rebound valve assembly and a compression valve assembly to control a flow of said working liquid within said tube during a rebound stroke and a compression stroke of said damper, wherein at least one end of said tube is provided with a narrowed section having a diameter that is smaller than a diameter of said main section;

said damper further comprising at least one additional piston assembly, displaceable along with said main piston assembly and adapted to be slidably introduced into said narrowed section of said tube to generate an additional damping force;

said additional piston assembly comprising a compression valve assembly comprising at least one deflective disc; a rebound valve assembly comprising at least one deflective disc; and a sealing ring assembly disposed between said compression valve assembly and said rebound valve assembly; and said sealing ring assembly comprising a first annular member provided with a plurality of spaced axial channels covered at a rebound side by said at least one deflective disc of said compression valve assembly; a second annular member provided with a plurality of spaced axial channels, covered at the compression side by said at least one deflective disc of said rebound valve assembly; an axial projection disposed between said first annular member and said second annular member at the radially internal side of said axial channels of said first annular member and said axial channels of said second annular member; and a sealing ring displaceable axially between said first annular member and said second annular member and radially over said axial projection and adapted to cooperate with said narrowed section of said tube.

2. The hydraulic damper according to claim 1, wherein said narrowed section of said tube comprises a conical section having an inclination within the range of from 0.3 to 5 degrees.

3. The hydraulic damper according to claim 1 wherein one or both of said at least one deflective disc of said compression valve assembly cooperates with an annular seat of said first annular member and said at least one deflective disc of said rebound valve assembly cooperates with an annular seat of said second annular member.

4. The hydraulic damper according to claim 1, wherein at least one of said at least one deflective disc of said compression valve assembly and said at least one deflective disc of said rebound valve assembly are provided with a plurality of spaced, radial recesses enabling for a flow of said working liquid through these radial recesses in a flat, undeflected position of said at least one of said at least one deflective disc of said compression valve assembly and said at least one deflective disc of said rebound valve assembly.

5. The hydraulic damper according to claim 1, wherein at least one of said compression valve assembly and said rebound valve assembly comprise at least one additional spring preloading said at least one deflective disc.

6. The hydraulic damper according to claim 1, wherein a radially internal side of said sealing ring is supported by at least one support member.

7. The hydraulic damper according to claim 6, wherein said support member is provided with a plurality of spaced, radial channels.

8. The hydraulic damper according to claim 1, wherein a radially external side of said sealing ring is chamfered.

9. The hydraulic damper according to claim 1, wherein said sealing ring is made from a polymeric material.

10. The hydraulic damper according to claim 1, wherein said sealing ring is biased by a spring.

11. The hydraulic damper according to claim 1, wherein said narrowed section of said tube is located on said compression chamber side of said tube.

12. The hydraulic damper according to claim 11, wherein said additional piston assembly is attached to an additional rod attached to said piston rod of said damper.

13. The hydraulic damper according to claim 1, wherein said damper is a twin-tube damper.

14. The hydraulic damper according to claim 1, wherein said narrowed section of said tube is provided at least partially with at least one axial slot.

15. The hydraulic damper according to claim 1, wherein said narrowed section of said tube has a form of an insert disposed inside said tube.

* * * * *